Figure 1:
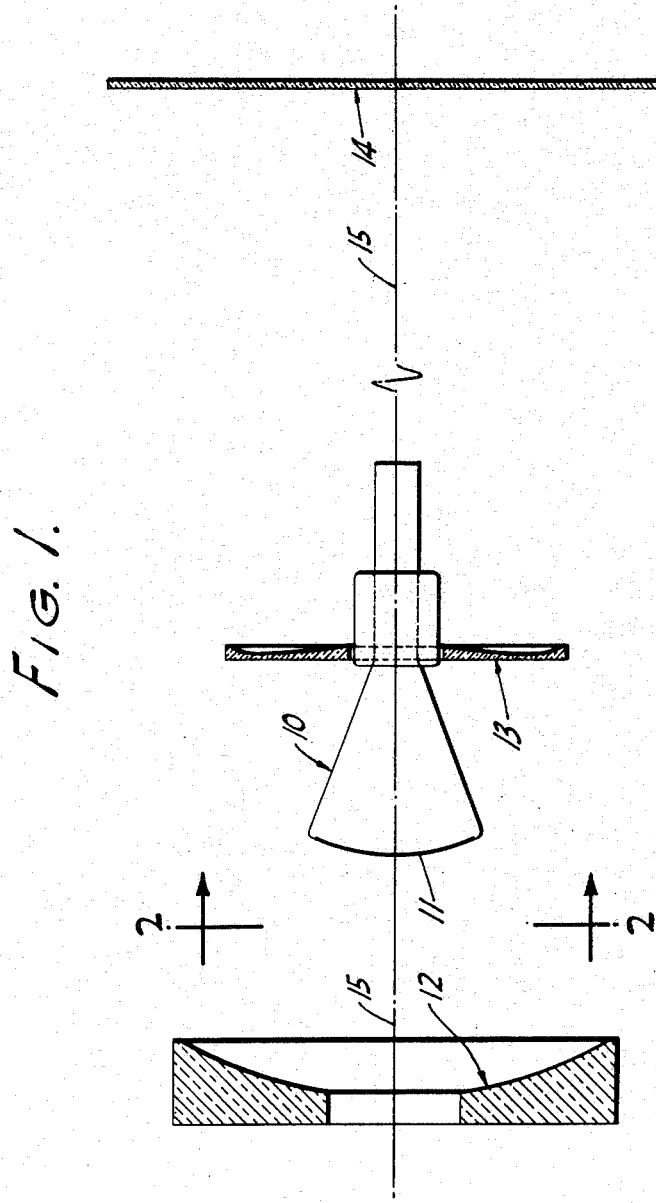

May 17, 1949.     E. H. TRAUB     2,470,198
IMAGE FORMING PROJECTION WITH
SCHMIDT-TYPE OPTICAL SYSTEM

Filed Sept. 27, 1946     2 Sheets-Sheet 2

CONSTRUCTIONAL DATA ($r_1 r_2^2 = K$)

| IMAGE RADII | STOP RADII |
|---|---|
| 1.50 in. | 5.35 in. |
| 1.62 " | 5.15 " |
| 1.79 " | 4.90 " |
| 2.00 " | 4.65 " |
| 2.22 " | 4.40 " |
| 2.50 " | 4.15 " |

INVENTOR.
ERNEST H. TRAUB
BY
Brown, Denk & Lynnestvedt
AGENTS

Patented May 17, 1949

2,470,198

UNITED STATES PATENT OFFICE 2,470,198

IMAGE FORMING PROJECTION WITH SCHMIDT-TYPE OPTICAL SYSTEM

Ernest H. Traub, Philadelphia, Pa., assignor to Philco Corporation, Philadelphia, Pa., a corporation of Pennsylvania Application September 27, 1946, Serial No. 699,729

2 Claims. (Cl. 88—24)

The present invention relates to image-forming optical systems and, more particularly, is concerned with the correction of coma effects.

While in its broader aspects, the invention is applicable to other systems, it is particularly useful with image-forming optical systems adapted for use in projection television receiving apparatus. One example of such apparatus, is a reflective system employing a spherical mirror and a Schmidt-type correcting plate, and detailed description of the invention, hereinafter, is directed to such apparatus.

In practice, the usable aperture ratio, or f/number, of optical systems is limited by spherical aberration, and by off-axis aberration, including coma. In the Schmidt-type optical system, the spherical mirror, per se, is not subject to coma, since it has no axis. However, the introduction of the correction plate, used to eliminate the spherical aberration arising at the reflector, establishes an axis and, particularly for large apertures, the power or slope of the margin of the plate does introduce objectionable coma. The significance of the latter aberration is apparent from the fact that the magnitude of the coma effect, in general, varies with the square of the aperture and with the radial displacement of primary object points from the axis. From study of such projection optical systems, I have found that—where rectangular or other non-circular image sources are employed, as is customary in television practice—while the central portions of the image projected on the viewing screen are in sharp focus, corner portions of the viewed image are not in good focus, due to the presence of coma. Study of the coma shows that the direction of the tail of the most disturbing image is usually opposite to that of the primary light spot, considered with reference to the optical axis of the projection system. This is due to the fact that the major portion of the light emanating from such off-axis points passes through a portion of the correction plate that is directly opposite in azimuth to the position of the off-axis source, this effect being caused by the rather substantial vignetting, or masking, produced by the tube and associated coils.

The coma defect becomes progressively worse, as the object points depart from the center of the frame, and prior constructions, due to the lack of a solution to the problem, have stopped-down the entire aperture to what may be termed a circle of tolerable coma.

The present invention has as its primary object the provision of an optical system in which the useful aperture of the system can be increased very considerably, beyond the limits of prior practice, without introduction of objectionable coma in the viewed image.

To this general end, the invention provides a reflective optical system, including aperture stop means so configured that the effective light-transmitting area of said stop means varies from a minimum, in the direction of the maximum dimension of a non-circular image source to a maximum in the direction of the smallest dimension taken across said image source, both said directions further being taken as passing through the optical axis and at right angles thereto. Or, considered with somewhat more particularity, the novel system of the present invention includes stop means having an effective margin so configured with respect to the marginal shape of the image source, that the product of the length of any radial line extending from the optical axis to a point on the margin of the image source, and the square of the length of a corresponding radial line extending from the axis to a point on the margin of the stop means, is substantially constant. This is accomplished by stopping down the aperture, in a direction opposite in azimuth from the direction of radial displacement of each marginal primary object point, a distance sufficient to eliminate the objectionable coma introduced by the passage of light from that object point through the opposite portion of the correction plate. The significance of this novel concept, and the manner in which its advantages may be realized, will fully appear in what follows.

It is also an object of this invention to provide a novel optical stop means for the above-stated purposes.

It is an additional, more detailed object of the present invention to provide a reflective optical system for use in television receiving apparatus, which system includes a correcting plate incorporating stop means so configured that the effective average diameter of the plate, and therefore the aperture of the system, may be increased beyond the point hitherto believed practicable.

Figure 2:
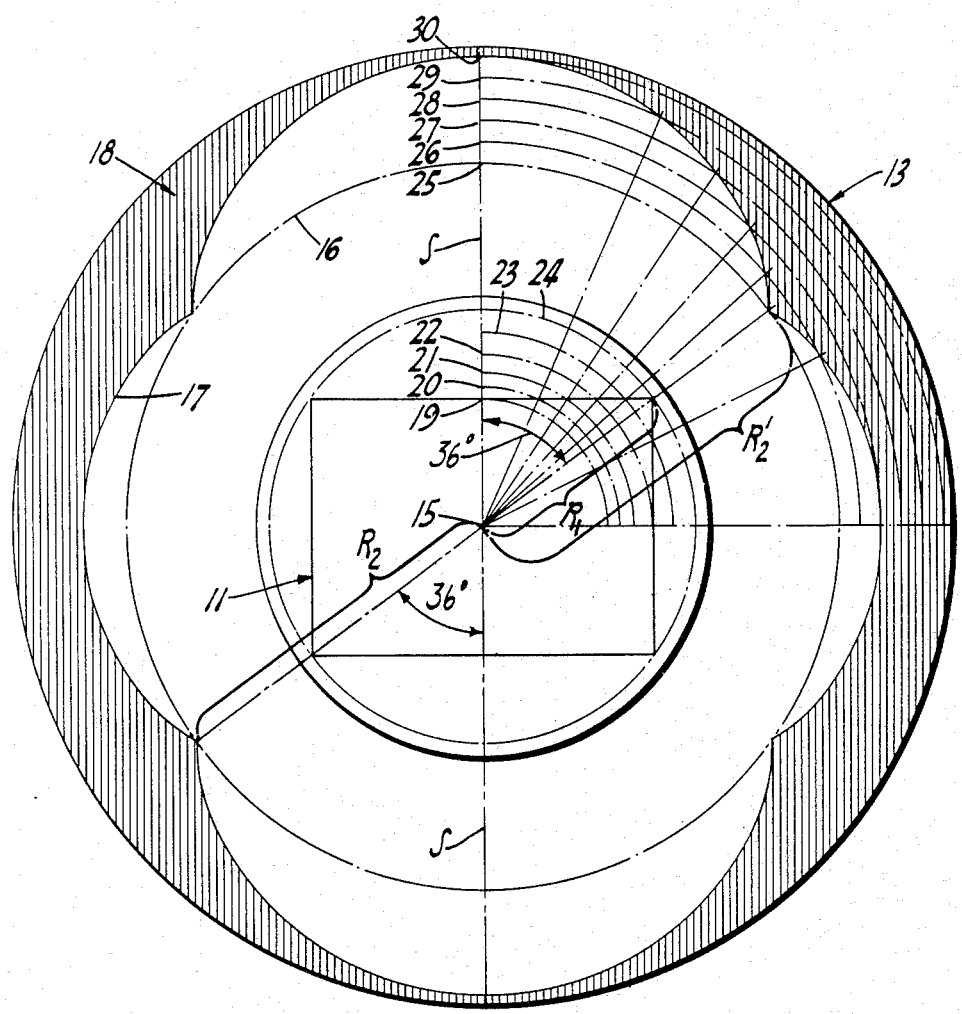

The manner in which the foregoing and other objects and advantages may best be achieved will become apparent from consideration of the following description, taken in the light of the accompanying drawings, in which:

Figure 1 is a somewhat diagrammatic illustration of projection apparatus of the reflective type, embodying the present invention; and, Figure 2 is an elevational view of certain elements of the apparatus of Figure 1, the view being taken as indicated by the line 2—2 of Figure 1 and also including certain construction lines illustrating the manner in which the curve of the stop means may be arrived at.

Making more detailed reference to Figure 1, there is shown an image projection system adapted for use with a television receiver, which system includes a picture tube 10 having a fluorescent screen or image source in the forward face thereof. This source is designated, generally, by the numeral 11 and, in accordance with usual practice, the image is rectangular in shape (Figure 2), in this instance the rectangle having an aspect ratio of 4 to 3. It should be borne in mind that the principles of the present invention are applicable to optical systems having image sources of other non-circular shapes. For example, the primary image might be square, oval, or have other configurations in which radial displacements measured from the optical axis are not equal.

The illustrated embodiment further includes a spherical reflector 12, and aspherically configured correcting plate 13, and a viewing screen 14. In operation, a small primary image is formed on the tube screen 11, which image is projected by the optical system and resolved as a magnified image in the plane of the viewing screen 14. The correcting element or plate 13 compensates for the spherical aberration introduced by mirror 12, said correcting plate being positioned substantially at the center of curvature of both the tube face and the mirror. The above-described elements define the optical axis of the system, indicated at 15. Since such Schmidt-type reflective systems are known, a detailed discussion of their operation and application to the television art is not necessary to a full understanding of the present invention. However, dimensions of a representative embodiment which has proven highly satisfactory will facilitate a clear understanding of the invention. These dimensions are as follows:

The radii of the tube face and the spherical reflector are equal to 7.25 and 13.7 inches, respectively, the tube having a maximum diameter of 5 inches and the mirror a diameter of 14 inches. The distances, (a) from the center of the tube face to the center of the spherical reflector, and (b) from the spherical reflector backwardly along the optical axis 15 to the central portion of the screen 14 (which are the conjugate distances of the system) are equal to 7.526 inches and 50.074 inches, respectively, for a magnification of 6.

Heretofore, in systems having such dimensions, the maximum permissible diameter of the correcting plate, which defines the aperture of the system, has been approximately 8.3 inches. As mentioned above, this diameter was determined by the circle of tolerable coma which, in turn, was related to the maximum radial displacement measured from the optical axis to the margin of the image source 11. This limitation has been considered rather critical since, as brought out above, the coma effect also varies with the square of the aperture.

As will now become evident, by utilization of the concepts of the present invention it is possible to substantially increase the total effective aperture and, for a system having the dimensions enumerated, the radial displacement of certain marginal portions of the effective aperture may be increased to 5.35 inches, that is, in certain zones, the correcting plate may now have an effective diameter of 10.7 inches, as compared with the 8.3 inch dimension previously permissible. The substantial significance of this improvement will be appreciated by referring to Figure 2, in which the circle represented at 16 defines the maximum aperture permissible under prior practice (diameter equal to 8.3 inches) while the entire unshaded portion lying outside of the circle 16 represents gain in light over the systems of prior practice, without exceeding the same predetermined limit of permissible coma.

The curve shown at 17 in Figure 2, that is the effective margin of the stop (said stop being defined by the shaded area shown at 18), has been arrived at by considering the image source and the aperture, section by section. Having in mind that the magnitude of the coma varies with the distance of the primary object point from the axis and with the square of the aperture, the margin of the aperture (in this instance the margin of the correcting plate) has been so configured as to keep constant: the product of the radial displacement from the optical axis of each object point on the picture margin, and the square of the radial displacement of a point on the margin of the stop 18. In this way there is provided considerably greater aperture in the region opposite those zones of the primary image which introduce the least coma, and less aperture in the azimuth opposite to points which would otherwise introduce substantial coma. At no point is the aperture stopped-down below the previous limit found to result in unobjectionable coma.

Thus the present invention contemplates that the radial displacement of points along the margin of the image source should be inversely proportional to the square of the length of a radial line extending from the axis to a point on the margin of the stop means, and this may be conveniently expressed mathematically, as follows:

$$[r_1][r_2]^2 = K$$

where $r_1$ is equal to the length of any radial line extending from the axis to a point on the margin of the image source, and $r_2$ is equal to the length of a corresponding radial line extending from the optical axis 15 to the margin of the stop means 18, K being equal to a constant determined by other dimensions of the system such, for example, as the conjugate distances, and the like. In practice, K is initially determined by substituting for $r_1$ and $r_2$ a known pair of limiting values, as will presently appear.

In considering the invention, and the appended claims, the term "corresponding radial line" should be understood to be a line measured in the opposite direction from the axis along that radial line (in the plane of the stop means) which has the same angular displacement, with respect to an assumed reference surface passing through and along the optical axis, as has the radial image line.

In Figure 2, $R_1$ is a specific image-source radial line and $R_2$ is the "corresponding" radial line, to the margin of the aperture stop. For convenience in illustration, and because of the symmetry of a rectangular image source, $R_2$ may be considered as lying in the same quadrant as $R_1$ and in Figure 2 such a rotated representation of $R_2$ is shown at $R_2'$.

Thus in Figure 2, $R_1$ and $R_2'$ (representing specific values of the generalized variables $r_1$ and $r_2$) depict corresponding radial lines lying in the planes of the image source and the stop means, respectively. That is, these two radial lines each have the same angular displacement with respect to the assumed reference plane or surface. In the embodiment illustrated in the drawings, and as clearly appears in Figure 2, this reference surface may be assumed to be the vertical midplane of the system, passing through and along the optical axis, and is designated at S in the drawing.

In a system of this type, any of the lines $r_2$ will be seen to extend, in the reverse direction, along a line coinciding with the geometric projection of a corresponding $r_1$, in the plane of the stop means. However, it should be recognized that in certain systems to which the invention is applicable, for example a system employing a plane mirror resulting in bending of the optical axis, a reference surface may be readily "projected" and thus located throughout the optical system, although said surface would then involve portions lying in two intersecting vertical planes. From inspection of Figure 2, it is evident that the angular displacements of $R_1$ and $R_2'$ (or of any other representative pair of radial lines) are equal, when considered with reference to the assumed plane or surface S. In the case of $R_1$ and $R_2'$, which represent the maximum excursion of the margin of the image and the minimum excursion of the inner margin of the stop means, respectively, the angular displacement of each with respect to the plane S is equal to approximately 36°.

As clearly appears in Figure 2, the lengths of the radial lines drawn from the optical axis 15 to the margin of the primary image 11 vary from a minimum of 1.5 inches to a maximum of 2.5 inches. A number of these radial lines, of which $R_1$ is the maximum, have been indicated on the figure, together with certain other constructional lines indicative of the manner in which the inner margin of the stop means has been arrived at. Assuming a rectangular primary image having a width equal to 4 inches and a height equal to 3 inches, six radial distances have been used for exemplary purposes and are included in the tabulation of constructional data. As has already been set forth, $[r_1][r_2]^2$ is equal to a constant, and it is readily possible to determine the corresponding values of $r_2$, which values are also included in the tabulation.

In analyzing the manner in which the stop configuration may be determined, one quadrant only need be considered, again bearing in mind that $R_2'$ is a rotated representation of $R_2$.

Circles shown at 19 to 24, inclusive, may conveniently be constructed, each circle having a radius corresponding to one of the assigned values of $r_1$, between its minimum value of 1.5 inches and its maximum value of 2.5 inches. Then, having established that a radial distance of 4.15 inches ($R_2'$ in Figure 2) corresponds to the circle of maximum permissible coma—assuming an image source having a maximum radial displacement of 2.5 inches—values may readily be derived for representative radial lines corresponding to various values of $r_2$, after first determining the constant of proportionality, K. Again, circles may be constructed having radii equal to the derived values of $r_2$, six such circles being represented at 29 to 30 in the drawing, and the extension of each of the several radial lines, of which $R_1$ is exemplary, until that line intersects the corresponding one of the circles 25 to 30 determines a point on the curve of the stop means. For example, $R_1$ as designated in the figure is the longest radial line extending from the axis to the margin of the primary image 11. From the inverse proportionality indicated above, it is known that this line must be extended until it intersects the innermost of the circles 25 to 30, and when so extended is of a length equal to a corresponding value for $R_2'$ (4.15") and determines the point of inflection of the curve. Other points are determined in a similar manner.

From the foregoing it is evident that the curve 17, defining the effective light-transmitting area of the aperture, corresponds to a line of constant coma, the magnitude of which never exceeds a permissible small value, and the effective aperture of the system is materially increased beyond the limit hitherto thought practicable.

While a representative embodiment of the invention has been illustrated in the drawing, and described in the foregoing specification, it should be understood that the invention is susceptible of certain changes and modifications, without departing from the essential spirit thereof. For example, although it is preferable that the stop means be provided upon the correcting plate, such location is not essential, the important factor being that said stop means be located in the general region of the plane of the aperture.

However, it will be understood that such modifications are contemplated as may come within the spirit of the appended claims.

I claim:

1. In an image-forming optical system having an optical axis, a spherical mirror, a substantially rectangular image source, a correcting plate defining an aperture of a diameter sufficiently large normally to permit coma effects to appear in the viewed image, and stop means for preventing such effects, said stop means being located generally in the plane of the correcting plate and being so configured with respect to the marginal shape of said image source that the diameter of the effective light-transmitting area of said stop means varies from a minimum, in the direction of the diagonal through said rectangular image source, to a maximum in the direction of the smallest dimension taken across said rectangular image source and passing through the optical axis.

2. In an image-forming optical system having an optical axis, a spherical mirror, an image source having marginal points which vary in radial displacement from the axis, a correcting plate defining an aperture of a diameter sufficiently large normally to permit coma effects to appear in the viewed image, and stop means for preventing such effects, said stop means being located generally in the plane of the correcting plate and having an inner margin so configured with respect to the marginal shape of said image source that the diameter of the effective light-transmitting area of said stop means varies from a minimum, in the direction of the greatest dimension across said image source, to a maximum in the direction of the smallest dimension taken across said image source and passing through the optical axis.

ERNEST H. TRAUB.

REFERENCES CITED

The following references are of record in the file of this patent:

UNITED STATES PATENTS

| Number | Name | Date |
|--------|------|------|
| 1,154,232 | Byron | Sept. 21, 1915 |
| 1,372,645 | Cooper | Mar. 22, 1921 |
| 2,090,398 | Hoyt | Aug. 17, 1937 |
| 2,170,979 | Straubel | Aug. 29, 1939 |
| 2,273,801 | Landis | Feb. 17, 1942 |
| 2,295,779 | Epstein | Sept. 15, 1942 |
| 2,307,210 | Goldsmith | Jan. 5, 1943 |
| 2,309,788 | Ramberg | Feb. 2, 1943 |

OTHER REFERENCES

The American Photo-Engraver, vol. 21, No. 10, 1929, pages 937–951; article by J. S. Mertle, page 944, cited.